Figure 1:
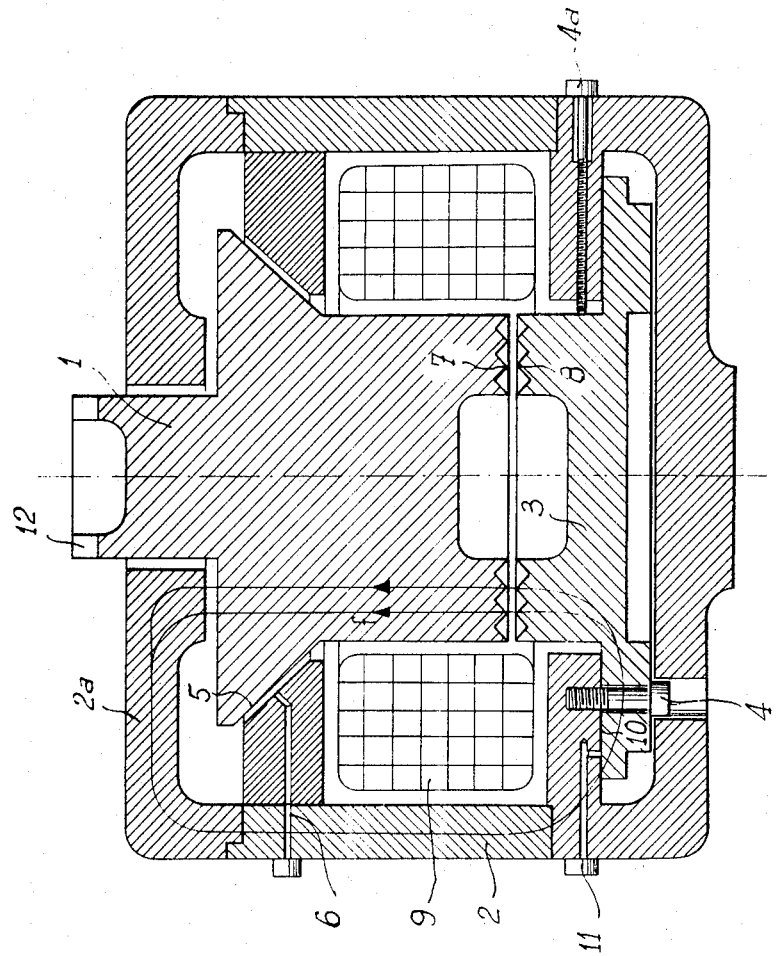

Dec. 5, 1967  R. CARRIERE ETAL  3,356,425
ROTATING MACHINE
Filed Aug. 12, 1963  2 Sheets-Sheet 1

INVENTORS
RAYMOND CARRIERE
HENRI FEHR
ROBERT DARGIER de SAINT-VAULRY
BY Bacon & Thomas ATTORNEYS INVENTORS
RAYMOND CARRIERE
HENRI FEHR
ROBERT DARGIER de SAINT-VAULRY
BY Bacon & Thomas
ATTORNEYS

United States Patent Office 3,356,425
Patented Dec. 5, 1967

3,356,425
ROTATING MACHINE
Raymond Carriere, Paris, Henri Fehr, Montmorency, and Robert Dargier de Saint-Vaulry, Rue de Paris Meudon, France, assignors to Commissariat a l'Energie Atomique, Paris, France
Filed Aug. 12, 1963, Ser. No. 301,485
Claims priority, application France, Aug. 22, 1962, 907,476
12 Claims. (Cl. 308—10)

This invention relates to high-speed rotating machines. Such machines when provided with conventional pivoting means, such as ball, oil, hydrodynamic or hydrostatic bearings may be subject to vibrations which are detrimental to their efficient operation. Moreover, in the case of oil bearings, it is obviously necessary to prevent splashing of lubricant, which gives rise to problems of fluid-tightness which are difficult to solve.

The present invention obviates these disadvantages by associating, in a rotating machine, a magnetic centering device with a conical gas abutment, whereby the aforesaid conventional bearings are obviated, and the machine rotates about a non-material axis.

This machine is composed essentially of:

(1) A fixed part forming a frame bearing a series of concentric annular teeth forming part of a magnetic centering member and comprising means for producing a continuous centering magnetic flux.

(2) A rotating part also comprising at one of its ends a series of concentric annular teeth situated opposite to the teeth of the fixed part so as to ensure the passage of the magnetic centering field from one series of teeth to the other.

This rotating part comprises also at the other end a conical gas abutment bearing on an element of the frame of the machine, which also serves to direct the centering magnetic field. This abutment is fed with compressed fluid and thus ensures the centering of the rotating part of the machine at a second point of the axis of rotation, while balancing the axial thrust produced by the magnetic centering.

The respective positions of the magnetic centering device and of the gas abutment may be reversed, provided that the axial thrust is compensated for.

Figure 2:
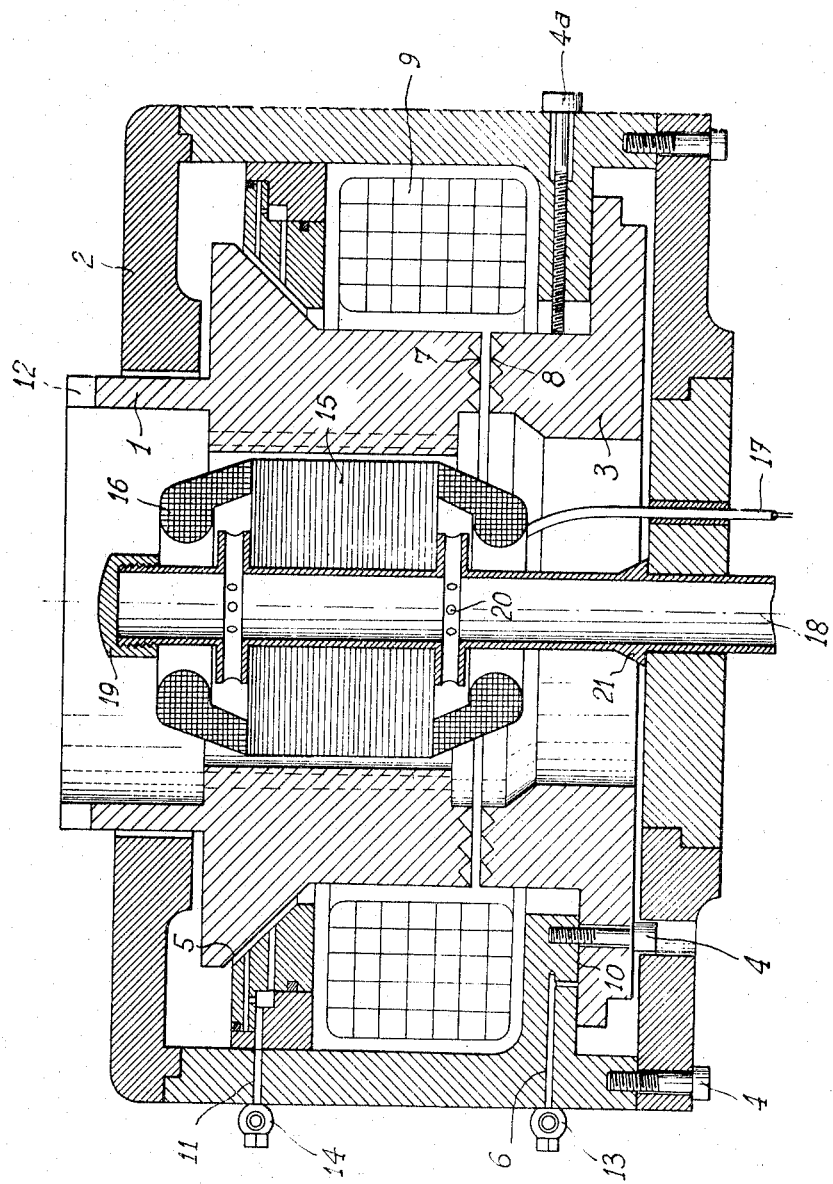

The invention will be more readily understood from the following further description and from the accompanying drawings, which further description and drawings are naturally given only by way of example and have no limiting character. In the drawings:

FIGURE 1 diagrammatically illustrates in section the construction of a bearing portion of a rotating machine according to the invention, and FIGURE 2 is a diagrammatic sectional view of an embodiment of the invention in the form of an electric motor, the axis of which may be vertical.

As shown in FIGURE 1, the rotating machine comprises a rotor 1 turning in a forked frame 2 on which a centering disc 3 is fixedly mounted by means of screws such as 4, which are positioned after the initial adjustment, as will hereinafter be seen.

The rotor 1 also comprises a conical abutment 5, of which the fixed seat is fed through ducts such as 6 in the frame 2, which lead to the abutment with appropriate orientation. The rotor comprises at the other end concentric annular teeth 7 situated opposite to the same number of similar annular teeth 8 provided on the centering disc 3.

The rotating machine also comprises a winding 9 which produces the unidirectional magnetic field, of which the lines of force $f$ of the induction circuit have been shown for centering the rotor 1. It will be seen that this circuit is looped by way of the portion 2a of the frame.

The centering disc 3 has a plane face 10 adapted to behave as a plane gas abutment when it is fed with compressed air by way of a duct such as 11 provided in the frame, which duct leads with appropriate orientation to the said plane face.

The said gas abutment serves to facilitate adjusting the magnetic centering device in relation to the conical abutment. For this purpose, when the conical abutment is not being fed with compressed fluid and is resting on its seat and when the windings 9 are energised, the compressed gas is passed through the ducts 11 to the plane abutment 10 to form a friction-free surface, which enables the centering disc to move radially in relation to the rotor under the influence of the magnetic field of the winding 9, the screws 4 being loose at this time. There is thus obtained complete coincidence between the teeth 7 and 8. When this coincidence is obtained, the admission of compressed gas through the ducts 11 is interrupted and the centering disc 3 is made fast with the frame 2 by means of the screws 4.

This adjustment may also be effected in a purely mechanical manner, for example by means of pointed screws such as 4a disposed radially at intervals in the fixed portion. These screws bear laterally against the centering disc, which can then move slightly along the contacting surfaces 10. After the adjustment, the screws 4 are returned into position.

The rotor 1 may have frontal teeth 12 ensuring the mechanical transmission of a torque, but any other magnetic, hydraulic or other method of transmission may be provided.

When the rotating machine is in operation, the gas abutment is fed with compressed gas through the duct 6, the opposed annuli 7 and 8 ensuring the centering of the rotor in conjunction with the abutment, while permitting the creation of an axial magnetic force which adjusts the load on the said abutment to a value compatible with stable vibration-free operation.

The angle of the cone of the abutment is such that the restoring froces resulting from the variations of the position of the rotor due to small radial or longitudinal displacements of the latter are greater than those set up at any other levels of the rotating part on occurrence of these same displacements.

The difference between these forces is such that the centering may be effected if the rotor undergoes centrifugal deformations due to high speeds of rotation.

FIGURE 2 illustrates by way of example an electric motor of which the axis may be vertical and which is constructed in accordance with the invention. For reasons of convenience, the same references have been employed to denote elements already illustrated in FIGURE 1.

The rotor, for example of the squirrel-cage type having conventional conductors shown by broken lines, which is of massive form in the case of the figure, comprises an external zone formed of a material of good magnetic permeability and good electric conductivity, which serves for the passage of the centering magnetic flux. The inner zone of the rotor is traversed by the pulsating field created by the stator 15 of said electric motor, to which reference will hereinafter be made. As in the case of FIGURE 1, the rotor comprises a series of annular teeth 7, which may be formed of annuli comprising ribs terminated by sharp edges. At the other end, the rotor comprises the conical abutment 5 bearing against an appropriate seat fast with the fixed frame 2. Extending through the frame are ducts such as 6 and 11 fed at 13 and 14 and terminated by nozzles opening in an appropriate way on to the conical abutment 5 and on to the plane surface 10 of the centering disc 3 respectively.

The laminated inner stator 15 receives the windings 16, which are fed with electric current from the outside through a group of connections 17. It may be cooled by a tubular central element 18 closed by a plug 19 and serving as a duct for the cooling air which is blown on to the windings 16 through the radial pipes 20. Alternatively, it could be cooled by any other means, such as fins disposed on the inner portion of the rotor. The stator 15 is made fast to the frame 2 by means of the sleeve 21.

The transmission of the torque may be effected, for example, by means of teeth 12 as in the case of FIGURE 1, or by any coupling of other type, for example a magnetic coupling adapted to utilize the centering magnetic flux.

We claim:

1. A rotating machine, comprising: a fixed frame; a rotor mounted in said frame for rotation about a vertical axis; gas bearing means supporting and centering said rotor at one end thereof, said gas bearing means comprising a conical, gas abutment on said rotor at said one end thereof concentric with the axis of said rotor, and a conical, gas abutment seat on said frame concentric with and opposed to said conical abutment and provided with ducts for supplying compressed gas to said conical abutment seat; magnetic centering means centering the other end of said rotor, said magnetic centering means comprising a plurality of concentric, annular generally V-shaped teeth on the other end of said rotor disposed concentric with the axis thereof, and a member fixedly secured to said frame and having a plurality of concentric, annular generally V-shaped teeth thereon equal in number to those on said rotor, each of said teeth on said member being disposed in opposed relation to a corresponding tooth on said rotor; and means for producing a continuous magnetic flux passing between the annular teeth on said member and the opposed annular teeth on said rotor.

2. A rotating machine according to claim 1, characterised in that the angle of the cone of the said conical abutment is such that the restoring forces resulting from small radial or longitudinal displacements of the rotor are greater than the forces set up at any other levels of the movable part on occurrence of the same displacements.

3. A rotating machine according to claim 1, characterised in that means for locking the said magnetic centering member on the said fixed frame are provided when the centering member has been adjusted.

4. A rotating machine according to claim 1 wherein said rotor is formed with a cylindrical bore coaxial therewith; a stator is disposed within said cylindrical bore coaxial with said rotor; a shaft is rigid with said stator and extends coaxially therethrough and outwardly from one end thereof, said shaft, at a point spaced from said stator, being fixedly secured to said frame supporting said stator coaxially within said rotor, said stator together with said rotor forming an electric motor, and means for supplying electric current to said stator.

5. A rotating machine according to claim 4, characterised in that the shaft supporting the stator of the said electric motor is tubular having openings in the walls thereof within the stator and serves to supply cooling fluid to the windings of the stator.

6. A rotating machine according to claim 4, characterised in that said shaft is fixedly secured to a lower surface of said frame and the upper end of the said rotor is provided with a toothed annulus serving to transmit a torque mechanically to a driven machine.

7. A rotating machine according to claim 4, characterised in that the upper part of the said rotor is provided with a nonmechanical torque transmission member.

8. A rotating machine according to claim 1 wherein said frame has a plane surface and said member comprises a disc having a plane surface in engagement with said plane surface of said frame, means for supplying compressed gas between said plane surfaces to provide therebetween a plane gas bearing; and means for making said disc fast with said frame, whereby, when compressed gas is not being supplied to said conical gas abutment seat, said continuous magnetic flux is passing between the annular teeth on said disc and the opposed, corresponding, annular teeth on said rotor, said means for making said disc fast with said frame is unfastened, and compressed gas is being supplied to said plane gas bearing, said disc will be readily adjusted radially, to bring the annular teeth thereon into coincidence with those on said rotor, by said magnetic flux.

9. A rotating machine according to claim 8, characterised in that the gas under pressure blown into the said plane gas abutment of the centering means is supplied through nozzles provided in the frame and appropriately oriented.

10. A rotating machine according to claim 8, characterised in that the adjustment of the said magnetic centering disc, when necessary, is effected by means of pointed screws disposed radially in the fixed frame and bearing laterally against the said disc.

11. A rotating machine according to claim 1 wherein said concentric annular teeth on said other end of said rotor extend outwardly from the lower surface of said rotor parallel to the axis of said rotor and lie in a plane normal to the axis of said rotor.

12. A rotating machine according to claim 1 wherein said gas bearing means supporting and centering said rotor at one end thereof is at the upper end of said rotor and said magnetic centering means centering the other end of said rotor is at the lower end of said rotor

References Cited

UNITED STATES PATENTS

| | | |
|---|---|---|
| 1,337,742 | 4/1920 | Abbott. |
| 2,869,933 | 1/1959 | Bissinger. |
| 3,063,039 | 11/1962 | Taft _____ 308—9 |
| 3,105,164 | 9/1963 | Farrot. |

FOREIGN PATENTS

| | | |
|---|---|---|
| 854,730 | 11/1952 | Germany. |
| 919,837 | 12/1946 | France. |
| 1,016,068 | 9/1957 | Germany. |

MILTON O. HIRSHFIELD, *Primary Examiner.*

J. J. SWARTZ, L. L. SMITH, *Assistaant Examiners.*